United States Patent [19]

Fujii

[11] Patent Number: 5,353,266
[45] Date of Patent: Oct. 4, 1994

[54] MAGNETOOPTICAL RECORDING METHOD

[75] Inventor: Eiichi Fujii, Yokohama, Japan

[73] Assignee: Canon Kabushiki Kaisha, Tokyo, Japan

[21] Appl. No.: 976,340

[22] Filed: Nov. 13, 1992

[30] Foreign Application Priority Data

Nov. 15, 1991 [JP] Japan ................. 3-326795
Nov. 15, 1991 [JP] Japan ................. 3-326796
Nov. 12, 1992 [JP] Japan ................. 4-326257

[51] Int. Cl.$^5$ .............................................. G11B 13/04
[52] U.S. Cl. ............................................ 369/13; 360/59
[58] Field of Search .......................... 369/13, 110, 14; 360/59, 114; 365/122; 428/694 ML, 694 MM

[56] References Cited

U.S. PATENT DOCUMENTS

| | | | |
|---|---|---|---|
| 4,878,132 | 10/1989 | Aratani et al. | 369/13 |
| 4,937,799 | 6/1990 | Hashimoto et al. | 369/13 |
| 4,955,007 | 9/1990 | Aratani et al. | 369/13 |
| 5,132,945 | 7/1992 | Osato et al. | 369/13 |
| 5,218,581 | 6/1993 | Ohta et al. | 369/13 |

Primary Examiner—Robert J. Pascal
Assistant Examiner—Tan Dinh
Attorney, Agent, or Firm—Fitzpatrick, Cella, Harper & Scinto

[57] ABSTRACT

Magnetooptical recording is effected simultaneously with an overwriting operation. A magnetooptical recording medium to be used in this method is provided with a first magnetic layer having a Curie temperature $T_1$ and a coercive force $H_1$, and a second magnetic layer having a Curie temperature $T_2$ higher than the Curie temperature $T_1$ and a coercive force $H_2$ smaller than the coercive force $H_1$. The first and second magnetic layers satisfy a predetermined condition. The second magnetic layer is solely initialized by use of an initializing magnetic field. After the initialization of the second magnetic layer, the medium is irradiated with a light beam. A magnetic field modulated according to recording information is applied to the portion irradiated with the light beam. A reflected light generated upon the irradiation of the light beam in the irradiation step is detected to reproduce the information recorded in the light beam irradiating portion. Then, it is confirmed whether the information has been correctly recorded on the recording medium on the basis of the recording information reproduced in the reproducing step.

4 Claims, 3 Drawing Sheets

MAGNETOOPTICAL RECORDING METHOD

BACKGROUND OF THE INVENTION

1. Field of the Invention

The present invention relates to a magnetooptical recording method for effecting magnetothermal recording and read-out utilizing a magnetic Kerr effect, and more particularly to a magnetooptical recording method for effecting verification by reading the recorded information simultaneously with the overwriting.

2. Related Background Art

The magnetooptical memory has been known as an erasable optical memory. Said magnetooptical memory has the advantages of achieving a higher density in recording and being capable of recording and reproduction without contact with the information recording surface, in comparison with the magnetic recording method utilizing solely a magnetic head, but is associated with the following two drawbacks that the recording speed is limited because the old information has to be erased prior to recording, and that the verification (confirmation of the recorded information) cannot be made at the time of recording. In order to cope with these problems, there is known a method of effecting the erasure, recording and verification simultaneously by means of three optical heads, but such a method requires a bulky apparatus having a high cost. Therefore, in order to increase the recording speed, there is known an overwriting method in which the new information is overwritten on the old information. For such overwriting, there are proposed, for example, a magnetic field modulating overwriting in which the recording is conducted under the irradiation of a continuous laser beam and the simultaneous application of a modulated magnetic field, and a light modulation overwriting in which the overwriting is achieved by a modulated laser beam in combination with an exchange-coupled laminated film. In these methods, however, the limitation in the recording speed is not sufficiently resolved since the verification has to be conducted after the recording operation.

In order to resolve the drawback of a slow recording speed in the magnetooptical memory it is effective to effect the verification simultaneously with the overwriting. In this case, the verification is conducted by detecting the reflected light of the laser beam irradiating the magnetooptical recording medium at the recording operation, reproducing the recorded information from said detected light, and to check whether the thus reproduced information coincides with the recording information. However, in the conventional light modulation overwriting, it is extremely difficult to effect the verification simultaneously with the recording, since the reflected light from the magnetooptical recording medium in the course of recording is modulated by the recording information, as the irradiating laser beam itself is modulated. Also in the magnetic modulation overwriting, in an area in front of the center of the recording light spot, the old information still remains because the recording layer of the magnetooptical recording medium is not heated to a temperature high enough for recording. For this reason, the reflected light from said recording medium in the course of a recording operation contains severe crosstalk from the old recorded information, so that it is difficult to effect the verification simultaneously with the recording operation.

SUMMARY OF THE INVENTION

The present invention has been attained for resolving the above-mentioned drawbacks in the prior art, and its object is to provide a magnetooptical recording method capable of effecting the verification of the recorded information simultaneously with the overwriting operation.

The above-mentioned object can be attained, according to the present invention, by a magnetooptical recording method for recording information on a magnetooptical recording medium provided at least with a first magnetic layer having a Curie temperature $T_1$ and a coercive force $H_1$ and a second magnetic layer having a Curie temperature $T_2$ higher than said Curie temperature $T_1$ and a coercive force $H_2$ smaller than the coercive force $H_1$, and satisfying the following relations at room temperature:

$$H_1 > \sigma_{w12}/2M_{s1}h_1, \quad H_2 > \sigma_{w12}/2M_{s2}h_2$$

wherein:

- $\sigma_{w12}$: interfacial magnetic wall energy between the first and second magnetic layers;
- $M_{s1}$: saturation magnetic moment of the first magnetic layer;
- $M_{s2}$: saturation magnetic moment of the second magnetic layer;
- $h_1$: thickness of the first magnetic layer; and
- $h_2$: thickness of the second magnetic layer, the method comprising steps of:
- initializing said second magnetic layer only by means of an initializing magnetic field;
- irradiating said medium with a light beam, after the initialization of said second magnetic layer;
- applying a magnetic field modulated according to information, in the irradiating position of said light beam;
- detecting the reflected light generated, in said irradiating step, by the irradiation of said medium with the light beam, thereby reproducing the information recorded in the irradiating position of said light beam; and
- discriminating whether the information has been correctly recorded on said medium, based on the recorded information reproduced in said reproducing step.

The above-mentioned object can be attained, according to the present invention, also by a magnetooptical recording method for recording information on a magnetooptical recording medium provided at least with a first magnetic layer having a Curie temperature $T_1$ and a coercive force $H_1$, a second magnetic layer having a Curie temperature $T_2$ lower than the Curie temperature $T_1$ and a coercive force $H_2$, and a third magnetic layer having a Curie temperature $T_3$ higher than the Curie temperature $T_2$ and a coercive force $H_3$ smaller than the coercive force $H_2$, and satisfying the following relations at room $$H_1 < \sigma_{w12}/2M_{s1}h_1,$$
$$H_2 > \sigma_{w23}/2M_{s2}h_2,$$
$$H_3 > \sigma_{w23}/2M_{s3}h_3$$

wherein:

$\sigma_{w12}$: interfacial magnetic wall energy between the first and second magnetic layers;

$\sigma_{w23}$: interfacial magnetic wall energy between the second and third magnetic layers;

$M_{s1}$: saturation magnetic moment of the first magnetic layer;

$M_{s2}$: saturation magnetic moment of the second magnetic layer;

$M_{s3}$: saturation magnetic moment of the third magnetic layer;

$h_1$: thickness of the first magnetic layer;

$h_2$: thickness of the second magnetic layer; and $h_3$: thickness of the third magnetic layer, the method comprising steps of:

initializing said third magnetic layer alone by means of an initializing magnetic field;

irradiating said medium with a light beam after the initialization of said third magnetic layer;

applying a magnetic field modulated according to information, in the irradiating position of said light beam;

detecting the reflected light generated, in said irradiating step, by the irradiation of said medium with the light beam, thereby reproducing the information recorded in the irradiating position of said light beam; and discriminating whether the information has been correctly recorded on said medium, based on the recorded information reproduced in said reproducing step.

DETAILED DESCRIPTION OF THE PREFERRED EMBODIMENTS

First Embodiment

Now the present invention will be explained in detail by embodiments thereof shown in the attached drawings. At first reference is made to FIG. 1 for explaining the configuration of a magnetooptical recording apparatus for executing the magnetooptical recording method of the present invention. A magnetooptical recording medium 10, for information recording by the interaction of light and a magnetic field, is shaped as a disk and is rotated at a constant speed by an unrepresented spindle motor. Said magnetooptical recording medium 10 is provided with two exchange-coupled magnetic layers (vertical magnetization films), wherein a first magnetic layer 2 and a second magnetic layer 3 are laminated in succession on a light-transmissive substrate 1. An optical pickup 4, incorporating therein optical elements such as a light source, lenses, a photodetector and the like, serves to irradiate the magnetooptical recording medium 10 with a recording (continuous) light beam, or to irradiate said medium with a reproducing light beam and to detect the reflected light therefrom. A recording error detection circuit 5 effects the verification for discriminating whether the recording has been correctly conducted and for detecting recording defects, utilizing the reflected light from the medium 10, detected by the optical pickup at the recording operation. A recording magnetic pickup 6, positioned opposite to the optical pickup 4 across the medium 10, is comprised of a floating magnetic head and applies a recording magnetic field modulated according to the recording information, to the irradiating portion of the recording light beam on the medium 10. An initializing magnetic head 7 serves to apply an initializing magnetic field, prior to the irradiation of the recording light beam onto the magnetooptical recording medium 10.

Figure 1:
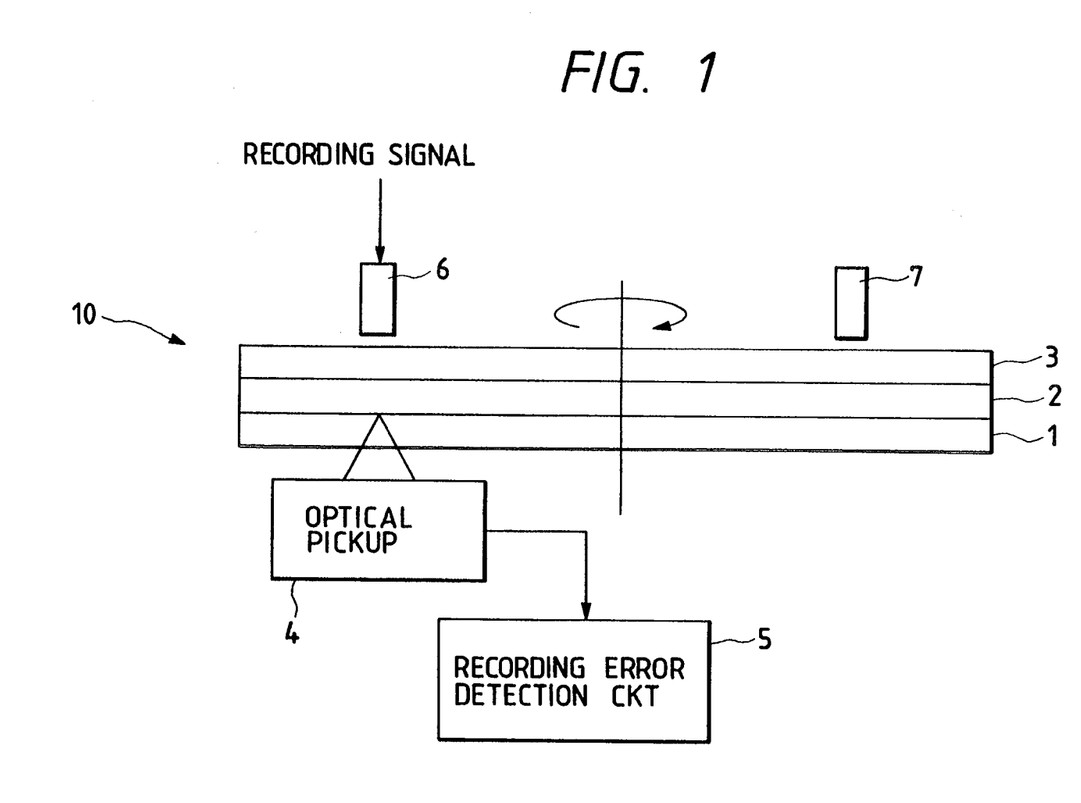
FIG. 1 is a view of a magnetooptical recording apparatus for executing the magnetooptical recording method of the present invention.

In the magnetooptical recording medium 10, the first magnetic layer 2 has a low Curie temperature and a large coercive force, while the second magnetic layer 3 has a high Curie temperature and a small coercive force. The terms "high", "low", "large" and "small" are defined by the comparison of the magnetic layers. The magnetic layers can be comprised of materials showing a vertical magnetic anisotropy and a relatively large magnetooptical effect, but amorphous magnetic alloys of rare earth metals and iron group elements are preferred. Specific examples of the materials for the first magnetic layer include Tb—Fe, Tb—Co, Tb—Dy—Fe, Dy—Fe, Dy—Co, Tb—Fe—Co, Tb—Dy—Fe—Co, Dy—Fe—Co, Gd—Tb—Fe—Co and Gd—Tb—Fe, while those of the materials for the second magnetic layer 3 include Tb—Fe, Tb—Dy—Fe, DyFe, Tb—Fe—Co, Tb—Dy—Fe—Co, Dy—Fe—Co, Gd—Tb—Fe, Gd—Tb—Dy—Fe, Gd—Dy—Fe, Gd—Tb—Fe—Co, Gd—Tb—Dy—Fe—Co and Gd—Dy—Fe—Co. A heat radiating layer may be provided on the magnetic layers, opposite to the light-transmissive substrate 1, in order to improve the S/N ratio of the verifying signal at the recording operation. Said heat radiating layer may be comprised of any material with a high thermal conductivity, but preferred are aluminum, gold, and alloys principally comprised of these metals. Also between the substrate 1 and the magnetic layers, or on said magnetic layer opposite to the substrate 1, there may be provided a suitable dielectric or reflective layer, for the purpose of improving durability, or improving the recording sensitivity and the magnetooptical effect. Said reflective layer may also function as the heat radiating layer. Also between the first magnetic layer 2 and the second magnetic layer 3, there may be provided a suitable magnetic or non-magnetic layer for controlling the magnitude of the exchange coupling.

Said initializing magnetic head 7 applies perpendicularly an initializing magnetic field to the magnetooptical recording medium 10, prior to the irradiation of the recording light beam, and said initializing magnetic field is so selected as to be smaller than the coercive force of the first magnetic layer 2 at room temperature but larger than that of the second magnetic layer 3 at room temperature. Said initializing magnetic head 7 may be comprised of a permanent magnet or an electromagnet, so positioned as to apply a perpendicular magnetic field to the recording medium 10, with a same radius as that of the recording light beam but in a position different from that of said recording light beam. The recording error detection circuit 5 checks whether the information recording has been correctly conducted, utilizing the reflected light from the magnetooptical recording medium in the course of a recording operation, for example by detecting the magnetooptical signal from said reflected light and comparing it with the recording signal, or by checking the recording errors through an error detection/correction circuit, or by demodulating the information from said reflected light and comparing it with the recording information.

Figure 2:
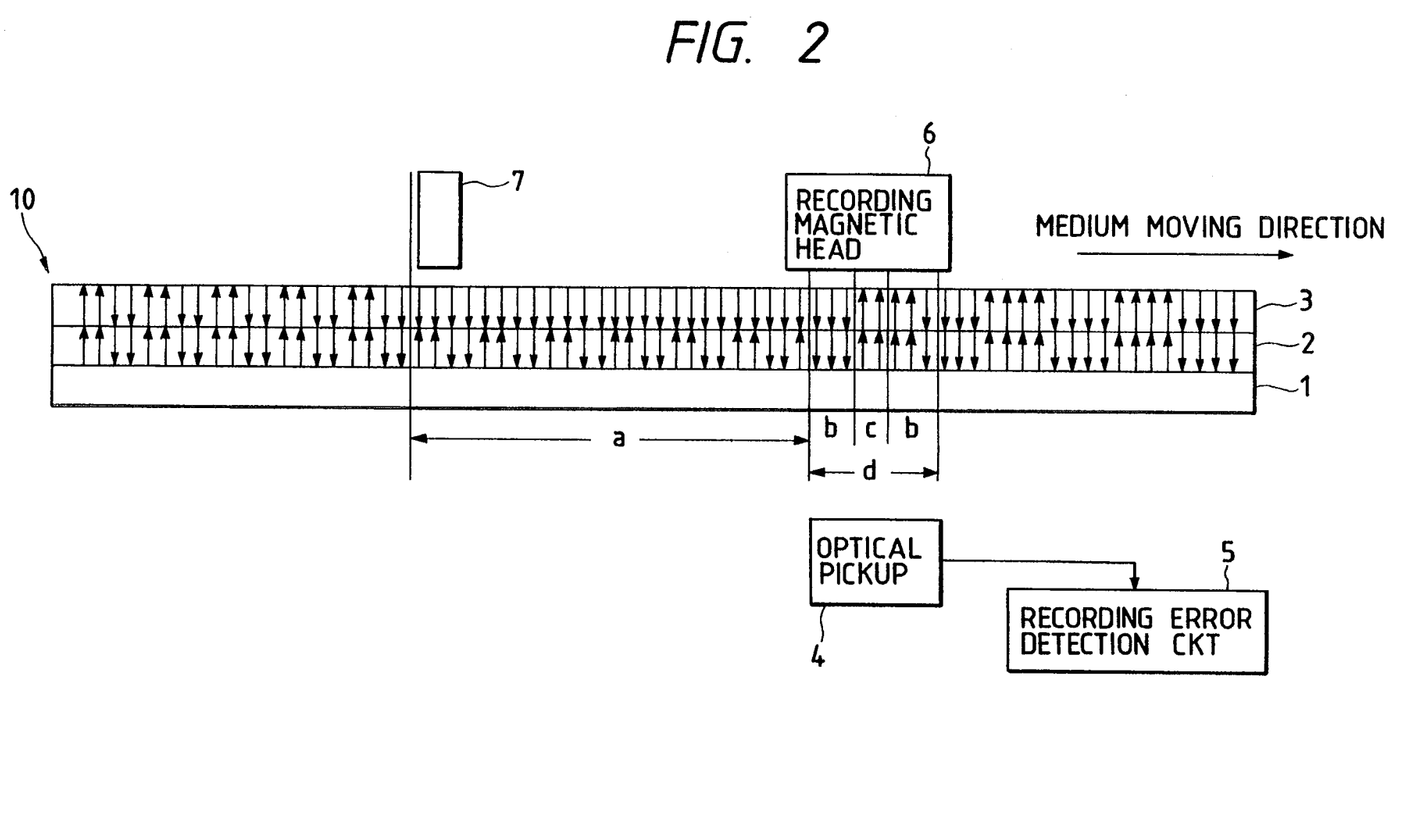
FIG. 2 is a view showing the recording process of a first embodiment of the magnetooptical recording method of the present invention.

In the following, the magnetooptical recording method of the present invention will be explained in more detail with reference to FIG. 2. When the recording medium 10 is rotated, at first the second magnetic layer 3 is magnetized in a particular direction by means of the initializing magnetic head 7. In order that the second magnetic layer 3 alone is magnetized in one direction without change in the magnetizing direction of the first magnetic layer 2, the magnetic field $H_i$ generated by the initializing magnetic head 7 satisfies the following equation (1):

$$H_1 - \frac{\sigma_{w12}}{2M_{s1}h_1} > H_i > H_2 + \frac{\sigma_{w12}}{2M_{s2}h_2} \quad (1)$$

wherein:
$H_1$: coercive force of the first magnetic layer 2;
$H_2$: coercive force of the second magnetic layer 3;
$M_{s1}$: saturation magnetic moment of the first magnetic layer 2;
$M_{s1}$: saturation magnetic moment of the second magnetic layer 3;
$h_1$: thickness of the first magnetic layer 2;
$h_2$: thickness of the second magnetic layer 3;
$\sigma_{w12}$: interfacial magnetic wall energy between the first and second magnetic layers 2, 3.

Also, in order to maintain the above-mentioned magnetized state even in the absence of the magnetic field $H_i$ generated by the initializing magnetic head 7, the first and second magnetic layers 2, 3 satisfy the following relations (2) and (3):

$$H_1 > \frac{\sigma_{w12}}{2M_{s1}h_1} \quad (2)$$

$$H_2 > \frac{\sigma_{w12}}{2M_{s2}h_2} \quad (3)$$

When an area of the magnetooptical recording medium enters an irradiating area d of the recording laser beam, upon rotation of said medium, in a relatively peripheral area b in said area d, the first and second magnetic layers 2, 3 are heated by the irradiating laser beam, whereby the coercive force of the first magnetic layer 2 is lowered and the first and second magnetic layers 2, 3 become to satisfy the following relations (4) and (5):

$$H_1 < \frac{\sigma_{w12}}{2M_{s1}h_1} - H_b \quad (4)$$

$$H_2 > \frac{\sigma_{w12}}{2M_{s2}h_2} + H_b \quad (5)$$

wherein $H_b$ is the recording magnetic field applied by the recording magnetic head 6.

Thus the magnetization of the second magnetic layer 3, which is in advance magnetized in a particular direction by the initializing magnetic head 7, is transferred to the first magnetic layer 2, whereby the old data recorded therein are erased. In a central area c of the irradiating area d of the recording laser beam, the first and second magnetic layers 2, 3 are heated further by the recording layer beam close to the Curie temperature of the second magnetic layer 3, whereby the following relations (6), (7) are satisfied:

$$H_1 < H_b \quad (6)$$

$$H_2 < H_b \quad (7)$$

This is because the laser beam has a Gaussian intensity distribution in a plan perpendicular to the optical axis, thus having a larger intensity in the vicinity of the optical axis, or in the central area. By applying, perpendicularly to the thus heated area of the magnetooptical recording medium 10, a vertical magnetic field from the recording magnetic head 6, based on the recording information, the first and second magnetic layers 2, 3 are magnetized upwards or downwards, according to the direction of the applied magnetic field, whereby the recording is attained. At the same time the reflected light of said laser beam is detected by the photodetector in the optical pickup 4, whereby the recording information is read simultaneously with the recording, and is reproduced as a verifying signal. Since said reflected light scarcely contains the reflected light from an area a where the old data remain, there can be obtained a satisfactory verifying signal, with low crosstalk from the old data. Said verifying signals are sent to the recording error detection circuit 5 for effecting the verification.

For the purpose of quantitatively confirming the effect of the present invention, the magnetooptical recording media of the present invention and of the reference examples were prepared, and the verifying signals and the crosstalk from the old data were compared in the recording method of the present invention and in the known magnetic field modulation magnetooptical recording method:

EXAMPLE 1

(1) A pre-grooved substrate was set and rotated in a sputtering apparatus with plural targets.

(2) A $Si_3N_4$ protective layer having a thickness of 600 Å was formed with a $Si_3N_4$ target and in argon atmosphere, with a sputtering speed of about 40 Å/min and a sputtering pressure of 0.15 Pa.

(3) Then, employing Tb, Fe and Co targets in argon atmosphere, there was formed a first magnetic layer of Tb—$(Fe_{0.96}Co_{0.04})$ with prevailing Fe—Co sub lattice magnetization, with a film thickness of 400 Å, a coercive force of about 15 kOe and $Ms = 50$ emu/cm$^3$, with a sputtering speed of about 100 Å/min, and a sputtering pressure of 0.15 Pa. The first magnetic layer had a Curie temperature of 145° C.

(4) Then, employing $Gd_{0.50}Dy_{0.50}Fe$ and Co targets in argon atmosphere, there was formed a second magnetic layer of $(Gd_{0.50}Dy_{0.50})$—$(Fe_{0.60}Co_{0.40})$ with prevailing Gd—Dy sub-lattice magnetization, with a thickness of 400 Å, a Curie temperature of 250° C., a compensation temperature of about 170° C., a coercive force of about 2 kOe, and $MS = 100$ emu/cm$^3$, with a sputtering speed of about 100 Å/min. and a sputtering pressure of 0.15 Pa.

(5) Finally, with a $Si_3N_4$ target in argon atmosphere, there was formed a $Si_3N_4$ protective layer having a thickness of 600 Å, with a sputtering speed of about 40 Å/min. and a sputtering pressure of 0.15 Pa.

(6) Then, after the film formations, ultraviolet hardenable resin was spin coated on the substrate, whereby the magnetooptical recording medium was completed.

The magnetooptical recording medium thus prepared was subjected to the recording operation in the magnetooptical recording method of the present invention, in the magnetooptical recording apparatus having a configuration as shown in FIG. 1, and there were investigated the verifying signal obtained from the optical pickup in the course of said recording and the crosstalk in said verifying signal, generated by the old data. In comparison with the verifying signal required for detecting the recording error, the amount of crosstalk resulting from the old data was less than $-1.0$ dB, and it was thus confirmed that the verification in the course of recording was possible.

Reference Example 1

A magnetooptical recording medium was prepared with an identical structure as that in example 1, except that the first magnetic layer was not formed and that the second magnetic layer was formed with a thickness of 800 Å. Said medium was subjected to the recording operation with an apparatus of the known magnetic field modulation magnetooptical recording method, with a configuration the same as that in FIG. 1 but excluding the initializing magnetic head 7, and there were investigated, as in example 1, the verifying signal obtained from the optical pickup in the course of recording and the crosstalk in said verifying signal, generated by the old data. In comparison with the verifying signal required for detecting the recording error, the amount of the crosstalk resulting from the old data was about $-3$ dB, so that the verification in the course of recording was very difficult.

EXAMPLE 2

A magnetooptical recording medium was prepared by forming the protective layer, the first magnetic layer and the second magnetic layer in the same manner as in the example 1, and then by depositing aluminum in a thickness of 1000 Å as a heat radiating layer, and was subjected to the recording operation with the magnetooptical recording method of the present invention, in the apparatus shown in FIG. 1. In comparison with the verifying signal obtained from the optical pickup in said recording operation, the crosstalk present in the verifying signal, caused by the previous data, was less than $-15$ dB, so that there could be obtained a satisfactory veryfying signal.

EXAMPLE 3

(1) On a pre-grooved disk-shaped substrate, a $Si_3N_4$ protective layer hving a thickness of 1100 Å was formed under the same conditions as in example 1.

(2) Then, a first magnetic layer of Tb—($Fe_{0.96}Co_{0.04}$) with prevailing Fe—Co sub-lattice magnetization, with a coercive force of about 15 kOe and Ms=50 emu/cm$^3$ was formed with a thickness of 100 Å. The first magnetic layer had a Curie temperature of 145° C.

(3) Then a second magnetic layer of ($Gd_{0.50}$——$DY_{0.50}$)—($Fe_{0.60}Co_{0.40}$) with prevailing Gd—Dy sub-lattice magnetization was formed with a thickness of 200 Å, a Curie temperature of 250° C, a compensation temperature of about 170° C., a coercive force of about 2 kOe and Ms=100 emu/cm$^3$.

(4) Then $Si_3N_4$ was deposited with a thickness of 300 Å as a protective and interference layer, and finally aluminum was deposited with a thickness of 500 Å.

The magnetooptical recording medium was completed by spin coating ultraviolet curable resin on the substrate after the above-mentioned film formations, and was subjected to a recording operation with the magnetooptical recording method of the present invention, employing the recording apparatus shown in FIG. 1. In comparison with the verifying signal obtained from the optical pickup in the course of said recording operation, the crosstalk present in the verifying signal, due to the old data was less than $-15$ dB, so that a satisfactory verifying signal could be obtained.

Second Embodiment

In the following there will be explained a second embodiment of the magnetooptical recording method of the present invention, which is different from the first embodiment in the configuration of the magnetooptical recording medium employed.

Figure 3:
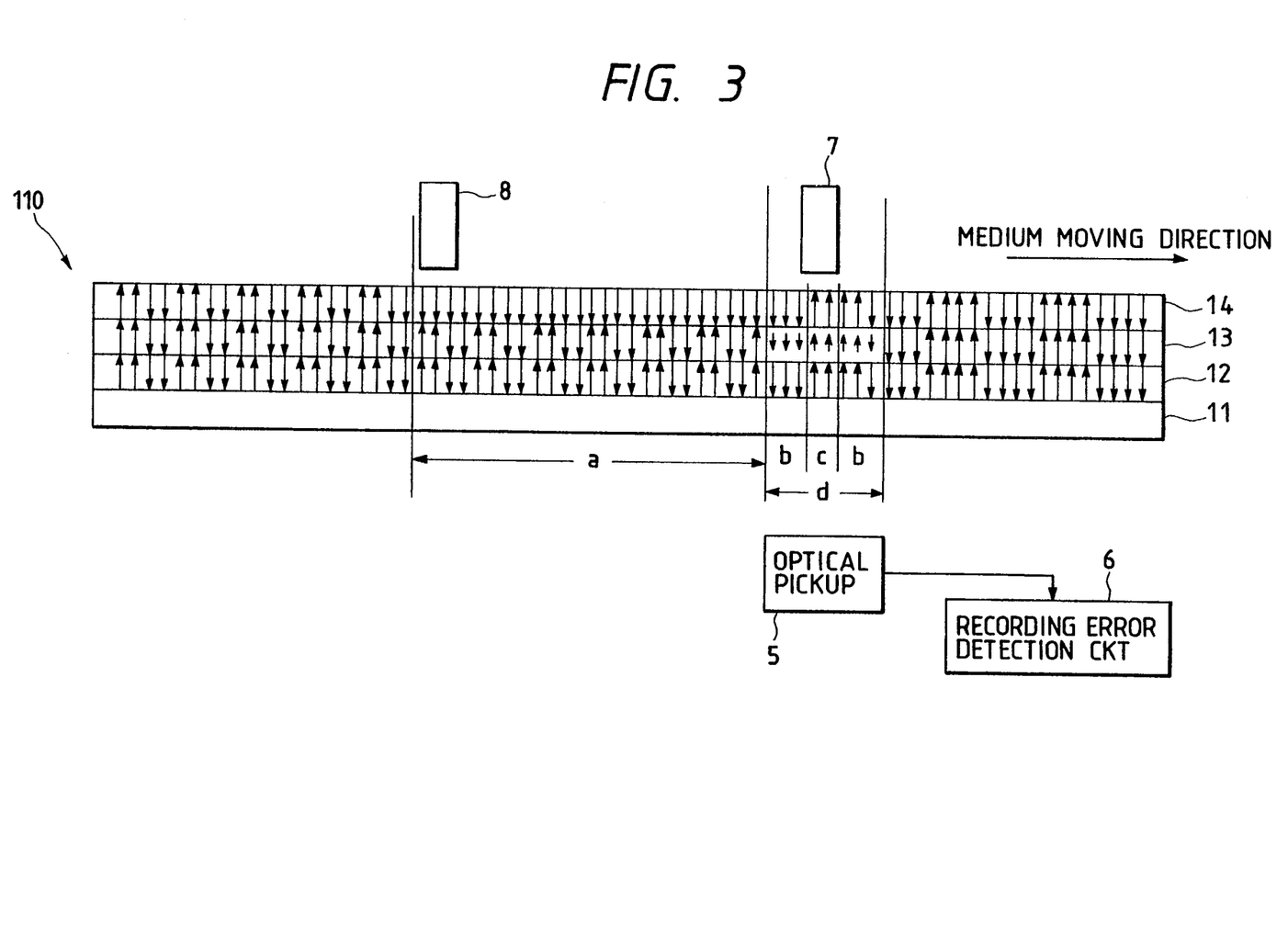
FIG. 3 is a view showing the recording process of a second embodiment of the magnetooptical recording method of the present invention.

In the present second embodiment, a magnetic layer with a large Kerr effect is provided, between the first magnetic layer 2 and the light-transmissive substrate in the first embodiment, in order to improve the reproduction characteristics. In the present second embodiment, a second magnetic layer 13 and a third magnetic layer 14 respectively correspond to the first and second magnetic layers 2, 3 in the first embodiment.

Now reference is made to FIG. 3 for explaining said second embodiment. In a magnetooptical recording medium 110, a first magnetic layer 12 has a Curie temperature higher than that of a second magnetic layer 13, and a third magnetic layer 14 has a Curie temperature higher than that of the second magnetic layer 13. Also, at room temperature, the coercive force of the second magnetic layer 13 is selected to be higher than that of the third magnetic layer 14. Stated differently, the first magnetic layer 12 has a high Curie temperature, while the second magnetic layer 13 has a low Curie temperature and a large coercive force, and the third magnetic layer 14 has a high Curie temperature and a small coercive force. The terms "high", "low", "large" and "small" are defined in relative manner through the comparison of the magnetic layers. The magnetic layers can be comprised of materials showing a vertical magnetic anisotropy and a relatively large magnetooptical effect, and there are preferably employed amorphous magnetic alloys of rare earth elements and iron group elements. Specific examples of the materials for the first magnetic layer 12 include Gd—Fe, Gd—Co, Ge—Fe—Co, Gd—Dy—Fe—Co, Dy—Fe—Co, Gd—Tb—Fe—Co, Gd—Nd—Fe—Co, Nd—Dy—Fe—Co, Pr—Dy—Fe—Co, Nd—Tb—Fe—Co and Tb—Fe—Co. Those of the materials for the second magnetic layer 13 include Tb—Fe, Tb—Co, Tb—Dy—Fe, Dy—Fe, Dy—Co, Tb—Fe—Co, Tb—Dy—Fe—Co, Dy—Fe—Co, Gd—Tb—Fe—Co and Gd—Tb—Fe, and those of the materials for the third magnetic layer 14 include Tb—Fe, Tb—Dy—Fe, Dy—Fe, Tb—Fe—Co, Tb—Dy—Fe—Co, Dy—Fe—Co, Gd—Tb—Fe, Gd—Tb—Dy—Fe, Gd—Dy—Fe, Gd—Tb—Fe—Co, Gd—Tb—Dy—Fe—Co and Gd—Dy—Fe—Co.

Also, the first magnetic layer 12 is preferably formed of a material with a small vertical magnetic anisotropy, while the second magnetic layer 13 is preferably formed of a material with a large vertical magnetic anisotropy. Also, a heat radiating layer may be formed on the magnetic layers, at a side opposite to the light-transmissive substrate 11, in order to improve the S/N ratio of the verifying signal at the recording operation. The heat radiating layer may be formed of a material with a high thermal conductivity, preferably aluminum, gold, or alloys having main components thereof. Furthermore, between the substrate 11 and the magnetic layers, or on said magnetic layers at a side opposite to the substrate 11, there may be provided a dielectric or reflective layer for improving the durability or improving the recording sensitivity and magnetooptical effect. The reflective layer can also serve as the heat radiating layer. Furthermore, a suitable magnetic or non-magnetic layer may be provided, between the second and third magnetic layers 13, 14, for controlling the magnitude of exchange coupling.

In this second embodiment, an initializing magnetic head 8 applies a vertical initializing magnetic field to the magnetooptical recording medium 110 prior to the irradiation of the recording light beam, and the magnitude of said initializing magnetic field is so selected as to be smaller than the coercive force of the second magnetic layer 13 at room temperature but larger than that of the third magnetic layer 14 at room temperature.

In the present second embodiment, when the magnetooptical recording medium 110 is rotated, at first the third magnetic layer 14 is magnetized in a particular direction, by the initializing magnetic head 8. In order to magnetize the third magnetic layer 14 alone in one direction, without altering the magnetizing direction of the second magnetic layer 13, the magnetic field $H_i$ generated by the initializing magnetic head 8 satisfies the following relation (8):

$$H_2 - \frac{\sigma_{w23}}{2M_{s2}h_2} > H_i > H_3 + \frac{\sigma_{w23}}{2M_{s3}H_3} \quad (8)$$

wherein:
$H_2$: coercive force of the second magnetic layer 13;
$H_3$: coercive force of the third magnetic layer 14;
$M_{s2}$: saturation magnetic moment of the second magnetic layer 13;
$M_{s3}$: saturation magnetic moment of the third magnetic layer 14;
$h_2$: thickness of the second magnetic layer 13;
$h_3$: thickness of the third magnetic layer 14; and
$\sigma_{w23}$: interfacial magnetic wall energy between the second and third magnetic layers 13, 14.

Also, in order that the above-mentioned magnetization is maintained in the absence of the magnetic field $H_i$ generated by the initializing magnetic head 8, the second and third magnetic layers 13, 14 satisfy the following relations (9) and (10):

$$H_2 > \frac{\sigma_{w23}}{2M_{s2}h_2} \quad (9)$$

$$H_3 > \frac{\sigma_{w23}}{2M_{s3}h_3} \quad (10)$$

Also, in order that a magnetic wall is not formed at the interface of the first and second magnetic layers 12, 13, the first magnetic layer 12 satisfies the following relation (11):

$$H_1 < \frac{\sigma_{w12}}{2M_{s1}h_1} \quad (11)$$

wherein:
$H_1$: coercive force of the first magnetic layer 12;
$M_{s1}$: saturation magnetic moment of the first magnetic layer 12;
$h_1$: thickness of the first magnetic layer 12; and
$\sigma_{w23}$: interfacial magnetic wall energy between the first and second magnetic layers 12, 13.

When an area of the magnetooptical recording medium enters the irradiation area d of the recording layer beam by the rotation of said medium, in a relatively peripheral area b of said area d, the second and third magnetic layers 13, 14 are heated by the irradiation of the recording laser beam whereby the coercive force of the second magnetic layer 13 is lowered and the second and third magnetic layers 13, 14 satisfy the following relations (12) and (13):

$$H_2 < \frac{\sigma_{w23}}{2M_{s2}h_2} - H_b \quad (12)$$

$$H_3 > \frac{\sigma_{w23}}{2M_{s3}h_3} + H_b \quad (13)$$

wherein $H_b$ is the recording magnetic field applied by the recording magnetic head 7.

Thus, the magnetization of the third magnetic layer 4, magnetized in advance in one direction by the initializing magnetic head 8 is transferred to the second magnetic layer 13, whereby the old data remaining therein are erased. Also in this state, since the first and second magnetic layers 12, 13 do not have a magnetic wall at the interface therebetween, the orientation of the second magnetic layer 13 is transferred to the first magnetic layer 12 by the exchange coupling action, so that the first magnetic layer 12 satisfies the following relation (14):

$$H_1 < \frac{\sigma_{w12}}{2M_{s1}h_1} - H_b \quad (14)$$

In a central area c of the irradiating area d of the recording laser beam, the second and third magnetic layers 13, 14 are further heated by the laser beam irradiation, close to the Curie temperature of the third magnetic layer 14, whereby the following relations (15), (16) and (17) are satisfied:

$$H_1 < H_b \quad (15)$$

$$H_2 < H_b \quad (16)$$

$$H_3 < H_b \quad (17)$$

This is because the laser beam has a Gaussian intensity distribution, in a plane perpendicular to the optical axis, thus having a higher intensity in the vicinity of the optical axis, namely in the central area. Thus, by applying a vertical magnetic field, perpendicularly to the magnetooptical recording medium 110 in the thus heated area, by the recording magnetic head 7 based on recording signals obtained by modulating the recording information, the first, second and third magnetic layers 12, 13, and 14 are magnetized upwards or downwards according to the direction of the applied magnetic field, whereby the recording is attained. At the same time, the reflected light of the recording laser beam is detected by the photodetector in the optical pickup 5, and the recorded information is read simultaneously with the recording and is reproduced as the verifying signal. Since the first magnetic layer 12 shows a large Kerr effect even under the irradiation with the recording laser beam because of the relatively high Curie temperature of said layer and also since the reflected light of the recording laser beam scarcely contains the reflected light from the area a where the old data remain, there can be obtained a satisfactory verifying signal with limited crosstalk resulting from the old data. Said verifying signal is sent to the recording error detection circuit 6 for effecting the verification.

For the purpose of quantitatively confirming the effect of the present invention, the magnetooptical recording media of the present invention and of the reference examples were prepared in the following manner, and the verifying signal and the crosstalk by the old data were compared in the recording method of the present invention and in the known magnetic field modulation magnetooptical recording method.

EXAMPLE 1

(1) A pre-grooved disk-shaped substrate was set and rotated in a sputtering apparatus with plural targets.

(2) A $Si_3N_4$ protective layer having a thickness of 600 Å was formed with a $Si_3N_4$ target and in argon atmosphere, with a sputtering speed of about 40 Å/min. and a sputtering pressure of 0.15 Pa.

(3) Then, employing Gd, Fe and Co targets in argon atmosphere, there was formed a first magnetic layer of Gd—$(Fe_{0.70}Co_{0.30})$ with prevailing Fe—Co sub-lattice magnetization, with a film thickness of 300 Å, Ms=50 emu/cm$^3$ and a Curie temperature of 300° C. or higher, with a sputtering speed of about 100 Å/min. and a sputtering pressure of 0.15 Pa.

(4) Then, employing Tb, Fe and Co targets in argon atmosphere, there was formed a second magnetic layer of Tb—$(Fe_{0.96}Co_{0.14})$ with prevailing Fe—Co sub-lattice magnetization with a thickness of 300 Å, a coercive force of about 15 kOe and Ms=50 emu/cm$^3$, with a sputtering speed of about 100 Å/min. and a sputtering pressure of 0.15 Pa. The second magnetic layer had a Curie temperature of 145° C.

(5) Then, employing Gd, Fe and Co targets in argon atmosphere, there was formed an intermediate layer of Gd—Fe—Co with prevailing Gd sub-lattice magnetization, with a thickness of 100 Å and Ms=300 emu/cm$^3$ with a sputtering speed of about 100 Å/min. and a sputtering pressure of 0.15 Pa. The intermediate layer serves to regulate the magnitude of exchange coupling between the second and third magnetic layers.

(6) Then, employing $Gd_{0.50}Dy_{0.50}$, Fe and Co targets in argon atmosphere, there was formed a third magnetic layer of $(Gd0.50Dy_{0.50})$—$(Fe_{0.60}Co_{0.40})$ with prevailing Gd—Dy sub-lattice magnitification, with a thickness of 400 Å, a Curie temperature of about 250° C., a compensation temperature of about 170° C., a coercive force of about 2 kOe and Ms=100 emu/cm$^3$, with a sputtering speed of about 100 Å/min. and a sputtering pressure of 0.15 Pa.

(7) Finally, employing a $Si_3N_4$ target in argon atmosphere, a $Si_3N_4$ protective layer having a thickness of 600 Å was formed with a sputtering speed of about 40 Å/min. and a sputtering pressure of 0.15 Pa.

(8) A magnetooptical recording medium was completed by spin coating ultraviolet curable resin on the substrate after the above—mentioned film formations.

The magnetooptical recording medium thus prepared was subjected to the recording operation, on the apparatus shown in FIG. 1, with the magnetooptical recording method of the present invention, and there were investigated the verifying signal obtained from the optical pickup in the course of the recording operation and the crosstalk involved in said verifying signal in said recording operation. In comparison with the verifying signal required for detecting the recording error, the amount of the crosstalk resulting from the old data was −10 dB or less. Also, the verifying signal had an S/N ratio of 20 dB or higher, and it was confirmed that the verification in the course of the recording operation was possible.

Comparative Example 1

A magnetooptical recording medium was prepared by forming, on a disk-shaped substrate, a $Si_3N_4$ protective layer having a thickness of 600 Å, then forming a magnetic layer of $(Gd_{0.50}Dy_{0.50})$—$(Fe_{0.60}Co_{0.40})$ with prevailing Gd—Dy sub-lattice magnetization, with a Curie temperature of about 250° C., a compensation temperature of about 170° C., a coercive force of about 2 kOe and Ms=100 emu/cm$^3$ further forming a $Si_3N_4$ protective layer having a thickness of 600 Å and finally spin coating ultraviolet curable resin. The magnetooptical recording medium thus prepared was subjected to the recording operation with the known magnetic field modulation magnetooptical recording method, with a magnetooptical recording apparatus of the known configuration obtained by removing the initializing magnetic head 8 from the structure shown in FIG. 1, and there were investigated, as in example 1, the verifying signal obtained from the optical pickup in the course of the recording operation and the crosstalk resulting from the old data and involved in the verifying signal. In comparison with the verifying signal required for detecting the recording errors, the amount of the crosstalk resulting from the old data was about −3 dB, so that the verification in the course of the recording operation was identified as being very difficult.

EXAMPLE 2

A magnetooptical recording medium was prepared by forming the protective layer and the first, second and third magnetic layers in the same manner as in the first example, and finally forming an aluminum heat radiating layer with a thickness of 1000 Å, and was subjected to the recording operation with the magnetooptical recording method of the present invention, with an apparatus as shown in FIG. 1. In comparison with the verifying signal obtained from the optical pickup in the course of the recording operation, the crosstalk resulting from the old data and involved in said verifying signal was −15 dB or less, while the S/N ratio of said verifying signal was 20 dB or higher, so that a satisfactory verifying signal could be obtained.

EXAMPLE 3

(1) On a pre-grooved disk-shaped substrate, a $Si_3N_4$ protective layer having a thickness of 900 Å was formed under similar conditions as those in example 1.

(2) Then formed were a first magnetic layer of Gd—$(Fe_{0.70}Co_{0.30})$ with prevailing Fe—Co sublattice magnetization with a thickness of 100 Å, a Curie temperature of 300° C. or higher and $Ms=50$ emu/cm$^3$, and a second magnetic layer of Tb—(-$Fe_{0.96}Co_{0.04}$) with prevailing Fe—Co sub-lattice magnetization with a thickness of 200 Å, a coercive force of about 15 kOe and $Ms=50$ emu/cm$^3$. The second magnetic layer had a Curie temperature of 145° C.

(3) Then formed was a third magnetic layer of $(Gd_{0.50}Dy_{0.50})$—$(Fe_{0.60}Co_{0.40})$ with prevailing Gd—Dy sub-lattice magnetization, with a thickness of 200 Å, a Curie temperature of about 250° C., a compensation temperature of about 170° C., a coercive force of about 2 kOe and $Ms=100$ emu/cm$^3$.

(4) Then $Si_3N_4$ was deposited with a thickness of 300 Å as a protective layer and an interference layer, and finally aluminum was deposited with a thickness of 1000 Å.

(5) A magnetooptical recording medium was obtained by spin coating ultraviolet curable resin on the substrate after the above-mentioned film formations, and was subjected to the recording operation in the magnetooptical recording method of the present invention, in a recording apparatus as shown in FIG. 1. In comparison with the verifying signal obtained from the optical pickup in the course of the recording operation, the crosstalk resulting from the old data and involved in said verifying signal was −15 dB or less, while the S/N ratio of said verifying signal was 20 dB or higher, so that a satisfactory verifying signal could be obtained.

As explained in the foregoing, the present invention provides a novel recording method which enables verification of the recorded information, simultaneously with the overwriting in the magnetooptical recording method. Said magnetooptical recording method which simultaneously enables erasure of information, recording of information and confirmation of recorded information, thereby improves the information transfer rate to the magnetooptical recording medium and the reliability of information. Also, the configuration of the apparatus can be significantly simplified.

What is claimed is:

1. A magnetooptical recording method for recording information on a magnetooptical recording medium that includes at least a first magnetic layer having a Curie temperature $T_1$ and a coercive force $H_1$ and a second magnetic layer having a Curie temperature $T_2$ higher than the Curie temperature $T_1$ and a coercive force $H_2$ smaller than the coercive force $H_1$ and satisfying the following conditions at room temperature:

$$H_1 > \sigma_{w12}/2M_{s1}h_1, \quad H_2 > \sigma_{w12}/2M_{s2}h_2$$

wherein $\sigma_{w12}$ is the interfacial magnetic wall energy between the first and second magnetic layers; $M_{s1}$ is the saturation magnetic moment of the first magnetic layer; $M_{s2}$ is the saturation magnetic moment of the second magnetic layer; $h_1$ is the thickness of the first magnetic layer; and $h_2$ is the thickness of the second magnetic layer, said method comprising the steps of:

initializing the second magnetic layer alone by means of an initializing magnetic field;

irradiating the medium with a light beam after the initialization of the second magnetic layer;

applying a magnetic field, modulated according to the information, to the position irradiated with the light beam;

detecting reflected light generated from the irradiation of the medium with the light beam in said irradiating step, thereby reproducing the information recorded at the position irradiated with the light beam; and discriminating whether the information has been correctly recorded on the medium, based on the recording information reproduced in said reproducing step.

2. A method according to claim 1, wherein the first and second magnetic layers are vertical magnetization films.

3. A magnetooptical recording method for recording information on a magnetooptical recording medium that includes at least a first magnetic layer having a Curie temperature $T_1$ and a coercive force $H_1$, a second magnetic layer having a Curie temperature $T_2$ lower than the Curie temperature $T_1$ and a coercive force $H_2$, and a third magnetic layer having a Curie temperature $T_3$ higher than the Curie temperature $T_2$ and a coercive force $H_3$ smaller than the coercive force $H_2$ and satisfying the following conditions at room temperature:

$$H_1 < \sigma_{w12}/2M_{s1}h_1,$$
$$H_2 > \sigma_{w23}/2M_{s2}h_2,$$
$$H_3 > \sigma_{w23}/2M_{s3}h_3$$

wherein $\sigma_{w12}$ is the interfacial magnetic wall energy between the first and second magnetic layers, $\sigma_{w23}$ is the interfacial magnetic wall energy between the second and third magnetic layers, $M_{s1}$ is the saturation magnetic moment of the first magnetic layer, $M_{s2}$ is the saturation magnetic moment of the second magnetic layer, $M_{s3}$ is the saturation magnetic moment of the third magnetic layer, $h_1$ is the thickness of the first magnetic layer, $h_2$ is the thickness of the second magnetic layer, and $h_3$ is the thickness of the third magnetic layer, said method comprising the steps of:

initializing the third magnetic layer alone by means of an initializing magnetic field;

irradiating the medium with a light beam after the initialization of the third magnetic layer;

applying a magnetic field, modulated according to the information, to the position irradiated with the light beam;

detecting reflected light generated from the irradiation of the medium with the light beam in said irradiating step, thereby reproducing the information recorded at the position irradiated with the light beam; and discriminating whether the information has been correctly recorded on the medium, based on the recording information reproduced in said reproducing step.

4. A method according to claim 3, wherein the first, second and third magnetic layers are vertical magnetization films.

* * * * *

UNITED STATES PATENT AND TRADEMARK OFFICE
CERTIFICATE OF CORRECTION

PATENT NO. : 5,353,266
DATED : October 4, 1994
INVENTOR(S) : Eiichi FUJII

It is certified that error appears in the above-indentified patent and that said Letters Patent is hereby corrected as shown below:

COLUMN 2:

Line 41, "generated," should read --generated--; and
   Line 62, "room" should read --room temperature:--.

COLUMN 3:

Line 21, "generated," should read --generated--.

COLUMN 5:

Line 26, "$M_{s1}$" should read --$M_{s2}$--.

COLUMN 6:

Line 10, "plan" should read --plane--;
   Line 49, "sub lattice" should read --sub-lattice--; and
   Line 55, "$Gd_{0.50}Dy_{0.50}Fe$" should read --$Gd_{0.50}Dy_{0.50}$, Fe--.

COLUMN 7:

Line 15, "-1.0 dB," should read -- -10 dB,--.

COLUMN 9:

Line 51, "σw23:" should read --$\sigma_{w23}$:--.

UNITED STATES PATENT AND TRADEMARK OFFICE
CERTIFICATE OF CORRECTION

PATENT NO. : 5,353,266
DATED : October 4, 1994
INVENTOR(S) : Eiichi FUJII

It is certified that error appears in the above-indentified patent and that said Letters Patent is hereby corrected as shown below:

COLUMN 10:

Line 10, "$\sigma_{w23}$:" should read --$\sigma_{w12}$:--.

COLUMN 11:

Line 63, "(Gd0.50Dy$_{0.50}$)" should read --(Gd$_{0.50}$Dy$_{0.50}$)--.

COLUMN 12:

Line 10, "above— mentioned " should read --above-mentioned--.

Signed and Sealed this

Sixth Day of June, 1995

Attest:

BRUCE LEHMAN

Attesting Officer

Commissioner of Patents and Trademarks